(12) United States Patent
Hubner

(10) Patent No.: US 7,303,340 B2
(45) Date of Patent: Dec. 4, 2007

(54) OPTOELECTRONIC TRANSMITTER MODULE AND METHOD FOR THE PRODUCTION THEREOF

(75) Inventor: Bernd Hubner, Santa Clara, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/471,964

(22) PCT Filed: Mar. 14, 2002

(86) PCT No.: PCT/DE02/00906

§ 371 (c)(1), (2), (4) Date: Mar. 15, 2004

(87) PCT Pub. No.: WO02/073276

PCT Pub. Date: Sep. 19, 2002

(65) Prior Publication Data

US 2004/0141697 A1 Jul. 22, 2004

(51) Int. Cl.
*G02B 6/42* (2006.01)
(52) U.S. Cl. ............ 385/92; 385/88; 385/94; 385/93; 385/91
(58) Field of Classification Search ........ 385/88, 385/91–94
See application file for complete search history.

(56) References Cited

U.S. PATENT DOCUMENTS

| | | |
|---|---|---|
| 4,837,768 A | 6/1989 | Schmid |
| 5,121,457 A | 6/1992 | Foley et al. |
| 5,127,072 A * | 6/1992 | Blauvelt et al. ............ 385/88 |
| 5,163,109 A * | 11/1992 | Okugawa et al. ............ 385/94 |
| 5,513,291 A * | 4/1996 | Buchin et al. ............ 385/93 |
| 5,617,495 A * | 4/1997 | Funabashi et al. ............ 385/92 |
| 5,717,804 A | 2/1998 | Pan et al. |
| 5,960,141 A | 9/1999 | Sasaki et al. |

(Continued)

FOREIGN PATENT DOCUMENTS

DE 3335529 A1 4/1985

(Continued)

OTHER PUBLICATIONS

U.S. Appl. No. 10/473,941, filed Oct. 3, 2003, Burkhard Seitz et al.

(Continued)

*Primary Examiner*—Frank G. Font
*Assistant Examiner*—James P. Hughes
(74) *Attorney, Agent, or Firm*—Workman Nydegger

(57) ABSTRACT

The invention relates to an optoelectronic emission module comprising a housing (B), which has electrical terminal contacts (5) for supplying and/or carrying away electric signals or for supplying electrical power. Said emission module also has at least one optical emission element (13), which is arranged inside the housing (3), and has at least one optical waveguide (17), which is held inside or on the housing (3) and in whose injection end (19) the light emitted by the at least one optical emission element (13) can be injected. The at least one optical emission element (13) and the injection end (19) of the at least one optical waveguide (17) are mounted on a supporting element. The invention also relates to a method for producing an emission module of the aforementioned type.

19 Claims, 3 Drawing Sheets

U.S. PATENT DOCUMENTS

Figure 1:
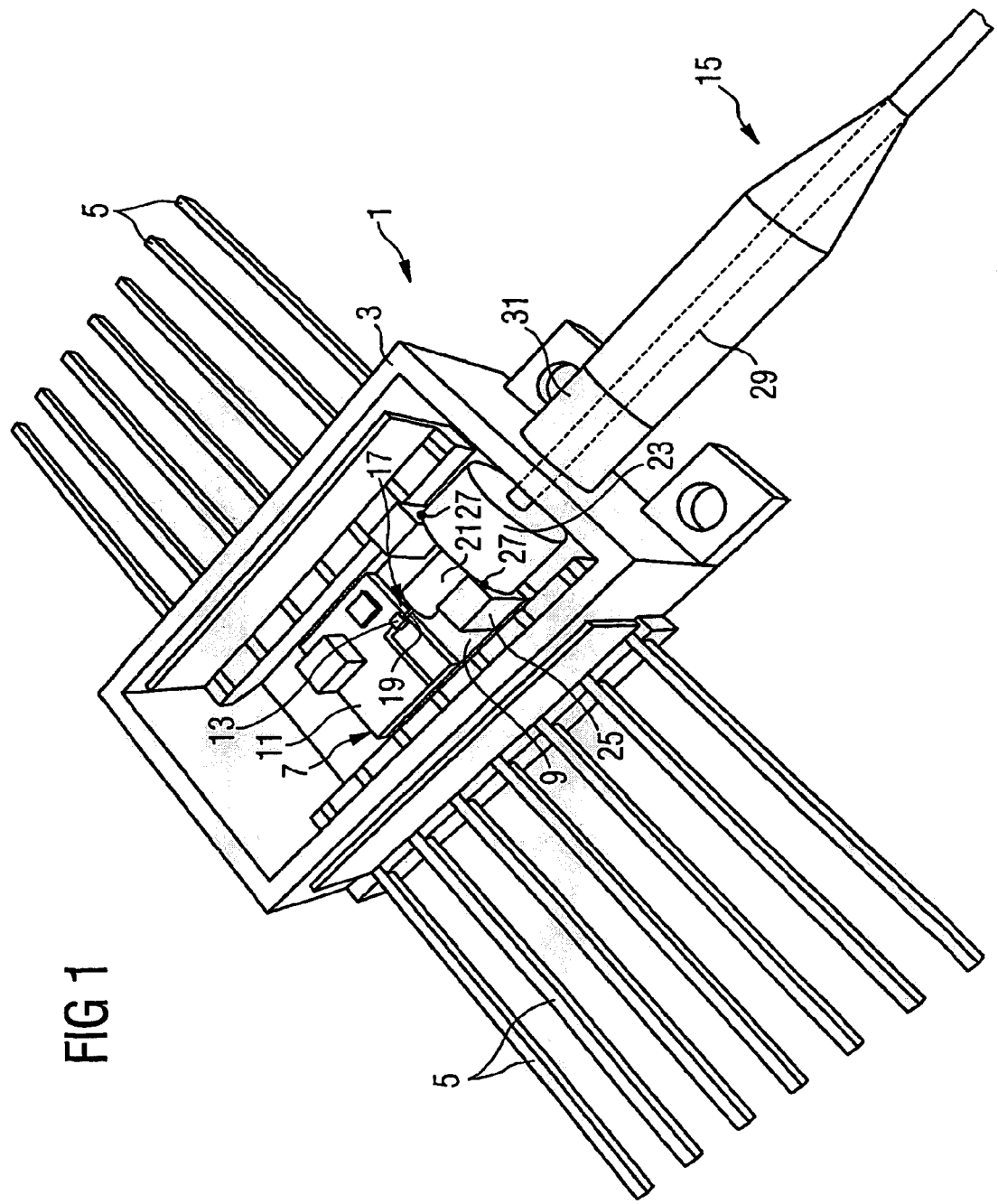

| | | | |
|---|---|---|---|
| 6,056,447 A * | 5/2000 | Caras | 385/92 |
| 6,181,854 B1 | 1/2001 | Kojima et al. | |
| 6,236,771 B1 * | 5/2001 | Aoki et al. | 385/2 |
| 6,478,477 B1 * | 11/2002 | Yamaguchi | 385/80 |
| 2002/0114590 A1 * | 8/2002 | Eichenberger et al. | 385/89 |
| 2004/0190570 A1 | 9/2004 | Hubner | |

FOREIGN PATENT DOCUMENTS

| | | |
|---|---|---|
| DE | 3732433 | 4/1989 |
| EP | 0569181 A1 | 11/1993 |
| EP | 0569181 B1 | 11/1993 |
| FR | 2661005 A1 | 10/1991 |
| FR | 2698453 A1 | 11/1992 |
| FR | 2698485 A1 | 11/1992 |
| JP | 2000-187136 | 7/2000 |

OTHER PUBLICATIONS

U.S. Appl. No. 10/473,940, filed Oct. 3, 2003, Burkhard Muller.
U.S. Appl. No. 10/473,940, filed Oct. 3, 2003, Müller, Burkhard.
U.S. Appl. No. 10/473,941, filed Oct. 3, 2003, Seitz, et al.
Hübner, B. et al., *Laser Diodes with Integrated Spot-Size Transformer as Low-Cost Optical Transmitter Elements for Telecommunications*, IEEE Journal of Selected Topics in Quantum Electronics, vol. 3, No. 6, Dec. 1997.

* cited by examiner

OPTOELECTRONIC TRANSMITTER MODULE AND METHOD FOR THE PRODUCTION THEREOF

The invention concerns an optoelectronic transmitter module having the characteristics of the generic concept of claim 1 as well as a method for the production thereof according to claim 12.

Optoelectronic transmitter modules, particularly laser modules, generally include a housing in which, besides the actual optical transmitter element, e.g., the laser chip or a LED chip, at least part of the control circuitry is contained. Mechanically and thermally stable coupling of the optical transmitter element to an optical waveguide is achieved by rigidly connecting a pigtail to the housing. To do this, the coupling end of the optical waveguide is guided into the housing and positioned with its front surface in front of the optical transmitter element so as to achieve optimum coupling efficiency. A design of this sort is used, for example, in pump laser modules, a cylindrical lens being formed preferably on the front surface of the coupling end.

The coupling end is held in a metal ferrule which during installation of the laser module in the housing is adjusted using an automatic adjustment tool in front of the laser chip previously installed therein until optimum coupling efficiency is achieved. Once it is optimally positioned, the metal ferrule is fastened using a laser welding process and a retaining element.

The retaining element is designed with a saddle shape; two saddle-shaped bends enclose the metal ferrule on the coupling end and two supporting surfaces that are outwardly turned in a perpendicular manner abut on the floor of the housing. The supporting surfaces are welded to the housing floor for mounting of the coupling end after reaching the optimum position and then the metal ferrule to the retaining part with its saddle-shaped design.

One disadvantage of an optoelectronic transmitter module of this sort is that the entire installation of the individual module elements must take place in the housing. This necessitates in particular a positioning tool that is costly to build for positioning the metal ferrule in which the coupling end of the optical waveguide is embedded. Moreover, the welding of the retaining part and the metal ferrule to the housing must take place in the housing itself, which entails significant difficulties due to the relatively limited space in the housing. In addition, in practical terms only the top side or rather the upper lateral regions of the metal ferrule are accessible for the welding procedure. Additionally welding the lower regions or rather the bottom side of the metal ferrule in order to achieve the most stable retention of the ferrule possible is thus very difficult.

A further problem associated with laser transmitter modules built in this manner is related to the hermetic sealing of the feedthrough of the pigtail through the housing. There is hardly any way to dispense with a hermetic seal, particularly since otherwise there is a risk that the coupling efficiency between the optical transmitter element and the coupling end of the optical waveguide can be impaired by ambient influences, particularly humidity.

Moreover, optoelectronic transmitter modules are known in which the optical transmitter element is arranged in a hermetically sealed housing, the light from the transmitter element emanating from the housing through a hermetically sealed window provided in the housing. On the outside of the housing, again the front side of the coupling end of the optical waveguide is fastened in a position in which optimum coupling efficiency is ensured. A disadvantage of this design is the cost of the necessary coupling optics between the light-emitting surface of the optical transmitter element and the front side of the coupling end of the optical waveguide positioned outside of the housing.

Based on the prior art described above, the underlying object of the invention is to create an optoelectronic transmitter module which has a design that is simple and simultaneously easy to install, it being possible to simultaneously guarantee the necessary mechanical and thermal stability as well as the long-term stability of the transmitter module. Moreover, the underlying object of the invention is to create a manufacturing technique for an optoelectronic transmitter module of this sort that guarantees that the transmitter module can be installed in the simplest and most cost-effective manner.

This objective is solved by the invention with the features of claim 1 or rather claim 12.

By arranging at least one optical transmitter element and fastening the coupling end of at least one optical waveguide on a common supporting element, the advantage ensues that this submodule can be assembled and checked and subjected to a burn-in test outside of the housing. Assembly outside of the housing simplifies the required procedural steps, particularly the positioning and fastening of the coupling end of the optical waveguide.

Moreover, the advantage is achieved that only functional submodules are installed in a housing. Whereas in known transmitter modules, the assembly takes place in the housing and if a procedural step fails, the entire previously assembled module including the housing must be rejected and discarded, in the transmitter module or rather manufacturing technique according to the invention, the possibility exists to reject and discard only the affected part of the submodule produced outside of the housing. Since housings, and particularly housings having a Peltier element already integrated or rather installed in them, generate a significant share of the costs of a completed transmitter module, a corresponding cost benefit ensues from the production of transmitter modules according to the invention.

According to the preferred embodiment of the invention, the common supporting element is made of a material with good heat conductivity, such as wolfram copper. In this manner, the supporting element can effectively convey the heat produced by the optical transmitter element or rather the control circuitry to the housing or rather to the Peltier element arranged below the supporting element.

According to the preferred embodiment of the invention, the optical transmitter element and the control circuitry including the required current paths or rather conductor tracks is [are] arranged on a substrate. The substrate can be made of, say, ceramics or silicon. In one embodiment of the invention, the optical waveguide end is held in a positioning and fastening element which has a stopping face for axially positioning the front side of the optical waveguide end, which stopping face cooperates with a stopping face formed on the supporting element. This results in the advantage that following precise cutting of the coupling end of the optical waveguide with respect to the stopping face of the positioning and fastening element, axial alignment of the coupling end can be eliminated.

In one embodiment of the invention, the positioning and fastening element includes a ferrule which can be made of glass or metal in which the coupling end is held, e.g., cemented into place. The stopping face for the axial positioning can be formed on the outer circumference of the ferrule.

According to the preferred embodiment of the invention, the positioning and fastening element includes a receptacle part which defines the stopping face for the axial positioning and which has a recess or rather bore hole in which the ferrule is held, preferably pressed in.

This results in a fastening for the coupling end which is mechanically and thermally stable over the long term.

According to another embodiment of the invention, the coupling end of at least one optical waveguide can be arranged directly on the substrate in front of the light-emitting surface of at least one optical transmitter element. For this purpose, at least one V groove can be formed in the substrate to receive and position the coupling end. Here, it is advantageous that fast and simple positioning of the coupling end can be guaranteed. However, a prerequisite for this is the precise positioning of the optical transmitter element on the substrate as well as the highly precise manufacture of the V groove(s).

Naturally, positioning of at least one coupling end using V grooves can be applied even when using a positioning and fastening element. Instead of a ferrule, here, the coupling end is inserted directly into the relevant V groove and fastened, e.g., applied with a fastening element (e.g., a plate) and/or cemented.

According to the preferred embodiment of the invention, coupling optics between the light-emitting surface of at least one optical transmitter element and the front surface of the relevant coupling end are eliminated. This applies also to a lens-shaped formation of the front surface of the coupling end. In this manner, according to the preferred embodiment of the invention, at least the space between the emitting surface of the optical transmitter element and the front surface of the coupling end can be filled with a transparent material, preferably a transparent sealing compound. The associated immersion does not disadvantageously affect the beam path due to the lack of coupling optics. Instead, what ensues as a result is the advantage of a reduction in the divergence of the light radiated by the optical transmitter element and a reduction in the optical power reflected at the boundary surfaces.

In order to make do without coupling optics, a semiconductor laser chip is preferably used as the optical transmitter element; such a semiconductor laser chip has spot broadening integrated in the chip by means of a taper structure (taper laser). As a result of the spot broadening, the emitting surface of the laser is matched to the spot radius of the optical waveguide. The divergence of the radiated light is simultaneously reduced and also matched to the numerical aperture of the optical waveguide.

If a sealing compound with long-term mechanical stability is chosen as the transparent material, this results in the advantage of a sort of encapsulation of the coupling region between the optical transmitter element and the coupling end. Thus, in a transmitter module according to the invention, a fully hermetic seal of the housing can be eliminated. This makes it possible, for example, to feed the optical waveguide through the housing wall simply by bonding the optical waveguide and by providing suitable mechanical stabilization of the region of the optical waveguide abutting the outer wall of the housing. This results in a simple and cost-effective construction of the transmitter module.

Further embodiments of the invention are provided by the dependent claims.

Figure 2:
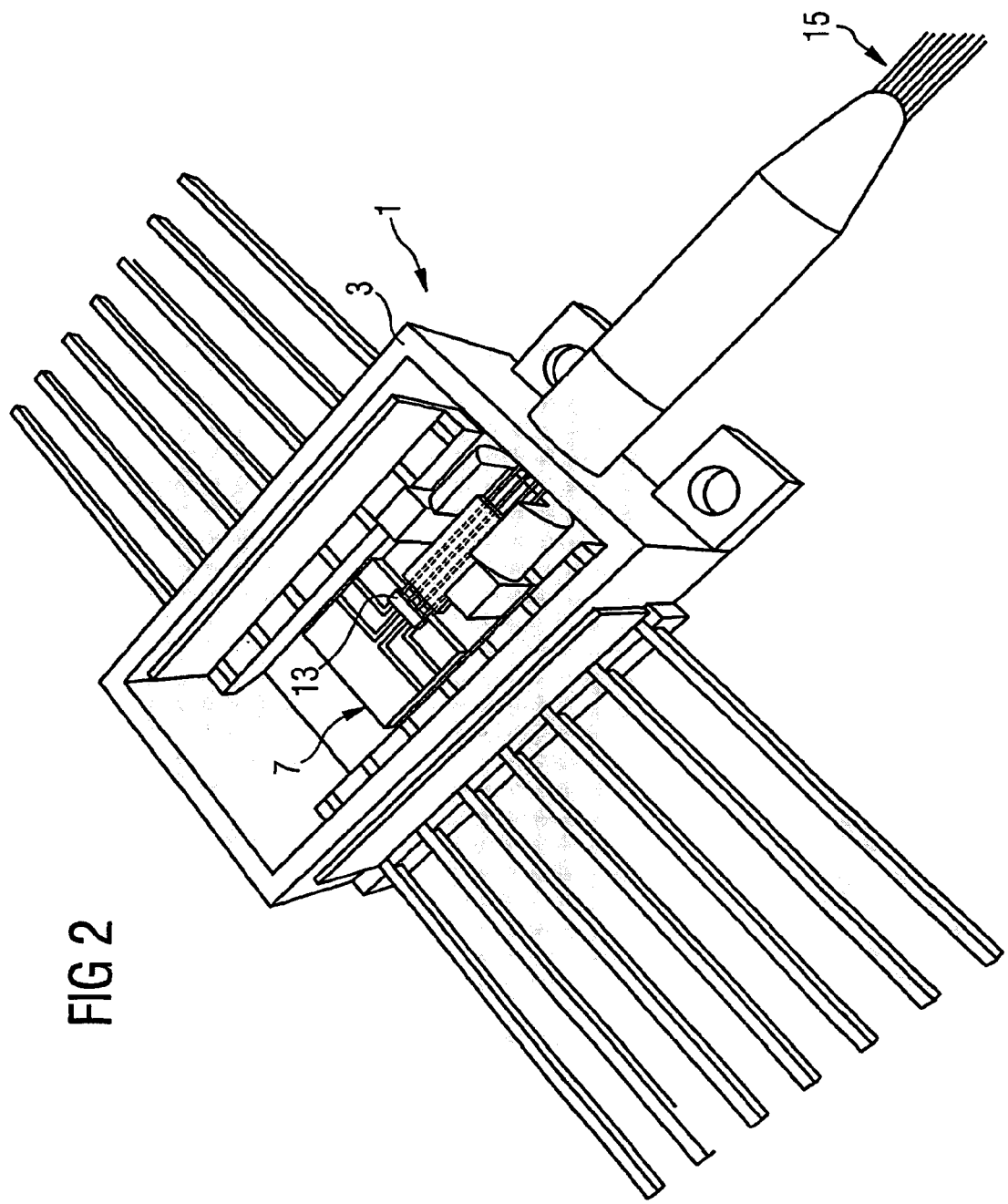
Figure 3:
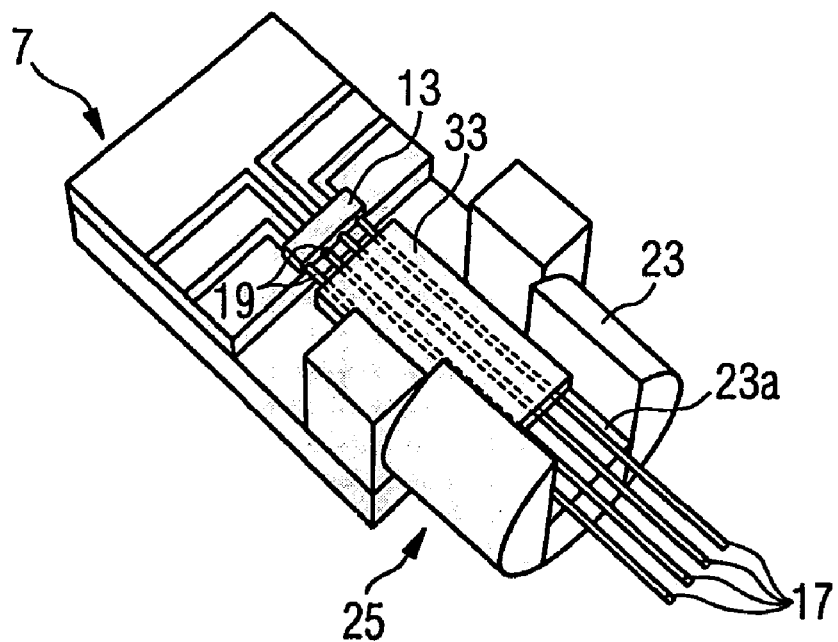

The invention is explained in greater detail hereafter based on embodiments shown in the drawings. The figures are as follows:

FIG. 1: A perspective schematic view of a first embodiment of a still open optical transmitter module according to the invention;

FIG. 2: A representation similar to FIG. 1 of a second embodiment of a transmitter module according to the invention;

FIG. 3: A perspective schematic representation of a submodule produced outside of the housing of the embodiment in FIG. 2; and FIG. 4: A perspective schematic representation of a submodule for a third embodiment of a transmitter module according to the invention.

The embodiment shown in FIG. 1 of an optoelectronic transmitter module 1 includes a housing 3 which in the shown embodiment is formed as a butterfly housing. Of course, any other housing type can also be used. The housing 3 has terminal contacts 5 extending in each case laterally outwards for supplying and/or carrying away electrical signals or for supplying electrical power. In the housing 3, a submodule 7 is arranged which includes a supporting element 9. On the supporting element 9, a substrate 11 is arranged, which can be made of ceramics, for example. The substrate 11 can be cemented to the supporting element 9, for example, or rigidly connected to it in some other manner.

On the substrate 11, an optical transmitter element 13 is preferably arranged so that the light-emitting surface of the transmitter element 13 terminates essentially flush with an outer side of the substrate 11. Besides the optical transmitter element 13, which is preferably formed as a laser chip, particularly a tape laser chip, further components of the electronic controller for the optical transmitter element 13 can be arranged on the substrate 11. Of course, this applies also to the track structures for making contact with the components. The contacting of the components arranged on the substrate 11 can take place in the conventional manner by means of bonding, corresponding terminal contact surfaces on the substrate 11 being connected to terminal contact surfaces provided in the housing of the terminal contacts 5.

For injection of the light emitted by the optical transmitter element 13 into the coupling end 19 of an optical waveguide 17 of a pigtail 15, the coupling end 19 must be positioned and fastened with its front surface exactly in front of the light-emitting surface of the optical transmitter element 13. For this purpose, in the embodiment shown in FIG. 1 of an optoelectronic transmitter module 1, the coupling end 19 is held in a ferrule 21, e.g., a glass ferrule. The coupling end 19 can be cemented for this purpose in the axial drill hole of the ferrule 21. The ferrule 21 and a receptacle part 23 form a positioning and fastening element 25 for the coupling end 19.

The receptacle part 23 can be designed with a ring shape, the ferrule 21 being held in the receptacle part 23, preferably pressed in.

The production of the positioning and fastening element for the coupling end 19 takes place, as does the arrangement of the substrate 11 on the supporting element 9 and the components on the substrate 11, outside of the housing 3. These two subunits, which are also still outside the housing, are thus connected together and fastened so that the front surface of the coupling end 19 is optimally positioned in front of the light-emitting surface of the optical transmitter element 13. The front face of the ring-shaped receptacle part 23 serves as a stopping face to position the coupling end 19 in the axial direction in front of the optical transmitter element 13, such that the stopping face cooperates with a corresponding stopping face on the front side of the supporting element 9. For this purpose, the supporting element 9 has on its front region a U-shape in terms of its cross section, its front side defining the relevant stopping face.

Whereas the rear region of the supporting element 9 on which the substrate 11 is arranged is made of a material with good heat conductivity, e.g., copper, the front U-shaped region of the supporting element 9 can be made of a material which can be easily welded to the ring-shaped receptacle part 23. A possible material for the U-shaped region and the receptacle part 23 is, say, covar. The joining of the U-shaped front region of the supporting element 9 to its rear region can take place, say, through soldering or welding.

The manufacture of the positioning and fastening element 25 takes place such that the front surface of the coupling end 19 of the optical waveguide 17 has a precisely defined spacing from the stopping face of the receptacle part 23. This can take place, for example, in that the coupling end 19 is precisely cut following the joining of the parts of the positioning and fastening element 25. This can take place, for example, through laser detachment of the coupling end 19.

Thus, no adjustment procedure is required on the coupling end 19 in terms of its axial direction. Only an adjustment of the coupling end 19 in the two transverse axes, i.e., in the radial direction, is required. The adjustment of the positioning and fastening element 25 with respect to the light-emitting surface of the optical transmitter element 13 can also take place, as was already described, outside of the housing 3. The adjustment procedure is carried out preferably using an automatic adjustment tool. For example, the adjustment can take place such that the optical transmitter element 13 is triggered and the optical power coupled into the coupling end 19 at the end of the optical waveguide 17 of the pigtail 15 is detected. In the position at which maximum transmission occurs (upon abutment of the stopping face of the receptacle part 23 and of the supporting element 9), this optimum position is then fixed through laser welding of the receptacle part 23 to the U-shaped region of the supporting element 9.

Since the welding of these two parts takes place outside of the housing so that these parts are accessible over the entire perimeter, two welding points U 27 can be set, for example, in the upper region of the U legs of the supporting element 9 and a third welding point (not shown) in the middle level of the submodule 7 in the lower region of the receptacle part 23 or rather of the U-shaped region of the supporting element 9. This results in a three-point welding joint with long-term mechanical stability.

Following the manufacture of the submodule 7, it can be subjected to further tests or rather to a burn-in test.

Installation in the housing 3 does not take place until it has been ensured that the submodule is fully functional in the desired manner. For this purpose, the pigtail 15 is pulled through a drill hole 29 in the housing 3, the drill hole 29 extending also through a cylindrical prolongation 31 which is provided on the outer wall of the housing 3. Then, the submodule 7 with the underside of the supporting element 19 is joined (e.g., cemented) to the housing floor or a Peltier element already arranged in the housing.

Then, the pigtail 15 is cemented in the drill hole 29 of the housing 3 and the feedthrough of the pigtail 15 is sealed off in this manner. Then, a mechanical fastening of the pigtail is normally applied, e.g., in the form of a heat-shrinkable sleeve or the like.

In a final step, the housing is sealed by applying a cover (not shown).

The embodiment of an optoelectronic transmitter module 1 shown in FIG. 2 corresponds essentially to the embodiment shown in FIG. 1. It differs, however, in that the pigtail 15 includes four optical waveguides instead of a single optical waveguide. Moreover, the optical transmitter element 13 is a four-way transmitter element. For this purpose, a single chip can include multiple lasers which in turn are designed essentially identically. The submodule 7 of the embodiment shown in FIG. 2 is shown in isolation in FIG. 3. As can be seen in FIG. 3, the receptacle part 23 is designed as an essentially cylindrical part which has a radial indentation of the desired width. In this indentation, a plate 23a is held which extends over the front side of the receptacle part 23 forming the stopping face in the direction of the optical transmitter element 13. In the surface of the plate 23a, four parallel-running V grooves are formed which are intended to guide and fasten the coupling ends 13 of the optical waveguides 17. The plate 23a can be cemented or welded to the floor of the indentation of the receptacle part 23. The fastening of the coupling ends 19 in the V grooves of the plate 23a can take place, for example, in that a fastening plate 33 is placed over the coupling ends 19 which fastening plate 33 the coupling ends 19 act upon with their under side. The fastening plate 33 can be cemented to the plate 23a and the coupling ends 19.

After the coupling ends 19 are fastened in the receptacle part 23, they can be cut in turn to a defined length referred to the stopping face of the receptacle part 23.

The adjustment of the positioning and fastening element 25 formed in this manner with respect to the four light-emitting surfaces of the four-way optical transmitter element 13 takes place in turn in the radial direction (preferably a first axis in the direction of the connecting straight lines of the four light-emitting surfaces and a second axis perpendicular to this) and additionally through rotation about the longitudinal axis of the receptacle part 23. The adjustment procedure takes place analogously to the embodiment described in conjunction with FIG. 1. Of course, two, three or all four lasers can be triggered for the adjustment procedure.

Figure 4:
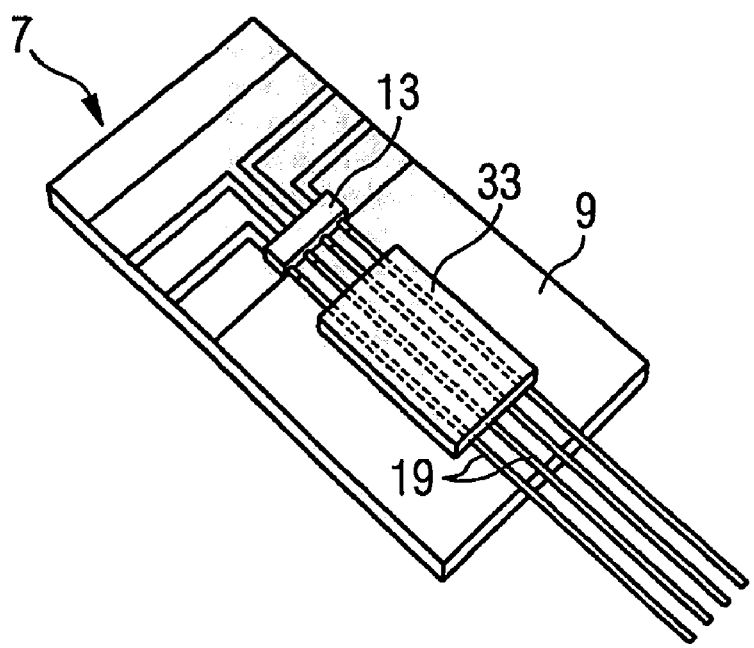

FIG. 4 shows a submodule 7 in which the supporting element 9 is formed by a substrate on which the optical transmitter element 13 and further components for controlling the optical transmitter element 13 are arranged, on the one hand, and on the other hand the coupling ends 19 are guided and fastened in V grooves already formed on the supporting element 9. The attachment of the coupling ends 19 can take place again by means of a fastening plate 33 in the previously described manner. Of course, an embodiment of this sort is possible with the four-way transmitter module shown in FIG. 4b, but it is also suitable for a simple (1-way) module or an n-way module. This also naturally applies to the embodiment according to FIGS. 2 and 3.

The invention claimed is:

1. An optoelectronic transmitter module comprising:
    a housing having electrical contacts for communicating electrically with the optoelectronic module and for supplying electrical power thereto;
    an optical transmitter element positioned inside the housing, wherein the optical transmitter element comprises a semiconductor laser chip having integrated spot broadening using a taper structure; and
    a contiguous optical waveguide positioned in the housing, the contiguous optical waveguide having a coupling end with a front surface into which light emitted by the optical transmitter element can be injected and a fiber grating for creating a fiber grating laser formed in the coupling end, wherein the optical transmitter and the coupling end of the contiguous optical waveguide are positioned on a supporting element such that the coupling end of the contiguous optical waveguide is configured to receive the light emitted by the optical transmitter from the optical transmitter.

2. The optoelectronic transmitter module of claim 1, wherein the supporting element is formed from a heat-conducting metallic material.

3. The optoelectronic transmitter module of claim 2, wherein the supporting element is connected to the housing so as to dissipate heat from the optical transmitter element.

4. The optoelectronic transmitter module of claim 2, wherein the supporting element is connected to a cooling element so as to dissipate heat from the optical transmitter element.

5. The optoelectronic transmitter module of claim 1, wherein the optical transmitter element is positioned on a substrate, by which the optical transmitter element is positioned on the supporting element.

6. The optoelectronic transmitter module of claim 1, wherein:
the coupling end is positioned in a fastening element;
the supporting element defines a first stopping face that cooperates with a second stopping face on the fastening element to define the position of the coupling end of the contiguous optical waveguide in the axial direction.

7. The optoelectronic transmitter module of claim 6, wherein the fastening element comprises a ferrule that holds the coupling end.

8. The optoelectronic transmitter module of claim 7, wherein:
the fastening element includes a receptacle part that defines the second stopping face; and
the ferrule is held in a drill hole in the receptacle part.

9. The optoelectronic transmitter module of claim 8, wherein the ferrule is press-fitted in the drill hole.

10. The optoelectronic transmitter module of claim 6, wherein a V-groove is formed in the fastening element to receive the coupling end.

11. The optoelectronic transmitter module of claim 1, wherein a V-groove is formed in the supporting element to receive the coupling end.

12. The optoelectronic transmitter module of claim 1, wherein a space between an emitting surface of the optical transmitting element and a front surface of the coupling end is filled with a transparent material.

13. The optoelectronic transmitter module of claim 12, wherein the transparent material is a transparent sealing compound.

14. The optoelectronic transmitter module of claim 1, wherein the housing is not hermetically sealed.

15. The optoelectronic transmitter module of claim 1, wherein the optical transmitter and the coupling end of the contiguous optical waveguide are positioned on a common supporting element.

16. The optoelectronic transmitter module of claim 1, wherein the optical transmitter element includes a plurality of light-emitting surfaces, the optoelectronic transmitter module further comprising:
at least one additional contiguous optical waveguide positioned in the housing, each of the contiguous optical waveguides having a coupling end with a front surface into which light can be injected, wherein the optical transmitter element and the coupling ends of the contiguous optical waveguides are positioned on a supporting element so that each of the plurality of front surfaces resides directly in front of a respective light-emitting surface of the optical transmitter.

17. The optoelectronic transmitter module as recited in claim 16, further comprising a fastening plate disposed over the coupling ends and attached to the supporting element.

18. The optoelectronic transmitter module as recited in claim 17, wherein the supporting element defines a plurality of grooves, each of which receives a portion of a respective contiguous optical waveguide.

19. The optoelectronic transmitter module as recited in claim 16, further comprising:
a positioning and fastening element upon which the plurality of coupling ends are at least partially disposed; and
a fastening plate disposed over the plurality of coupling ends and attached to the supporting element.

* * * * *

UNITED STATES PATENT AND TRADEMARK OFFICE
CERTIFICATE OF CORRECTION

PATENT NO. : 7,303,340 B2
APPLICATION NO. : 10/471964
DATED : December 4, 2007
INVENTOR(S) : Hubner It is certified that error appears in the above-identified patent and that said Letters Patent is hereby corrected as shown below:

Drawings
Replace Figure 2 with the figure depicted herein below, wherein the reference number 3 for the housing, which is never mentioned in relation to Figure 2, has been removed.

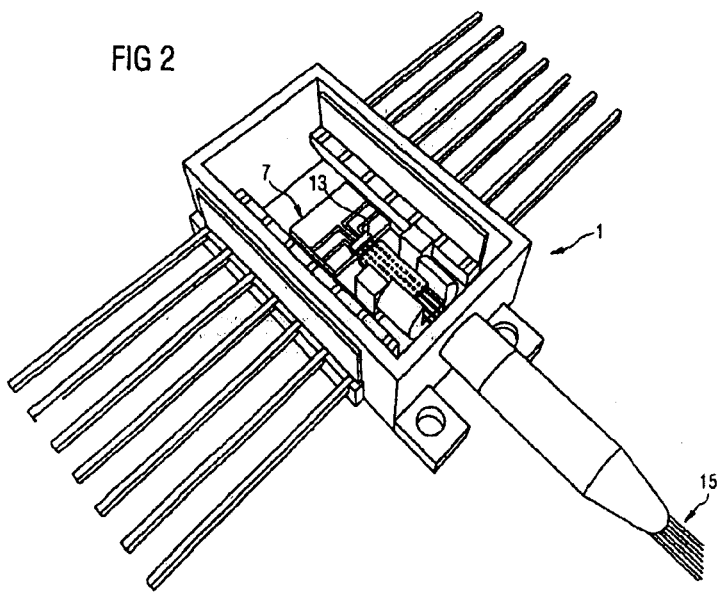

Column 1
Line 49, change "lower regions or rather" to --lower regions, or--
Line 50, change "ferrule in order" to --ferrule, in order--
Line 65, change "housing, again the front" to --housing, the front--
Line 66, change "waveguide is fastened" to --waveguide is again fastened--

Signed and Sealed this

Fifth Day of October, 2010

David J. Kappos
Director of the United States Patent and Trademark Office

Column 2
Line 31, change "and discarded, in the" to --and discarded. In the--
Line 44, change "transmitter element or rather" to --transmitter element, or--
Line 45, change "circuitry to the housing or rather" to --circuitry, to the housing, or--
Line 48, change "control circuitry" to --control circuitry,--
Line 49, change "or rather conductor" to --or conductor--
Line 50, change "tracks is [are]" to --tracks, are--

Column 3
Line 4, change "a recess or rather bore hole" to --a recess, or bore hole,--
Line 21, change "ferrule, here, the" to --ferrule, the--

Column 5
Line 56, change "7 with the" to --7, with the--
Line 57, change "19 is joined" to --19, is joined--

Column 6
Line 49, change "FIG. 4*b*," to --FIG. 4,--